Figure 1:
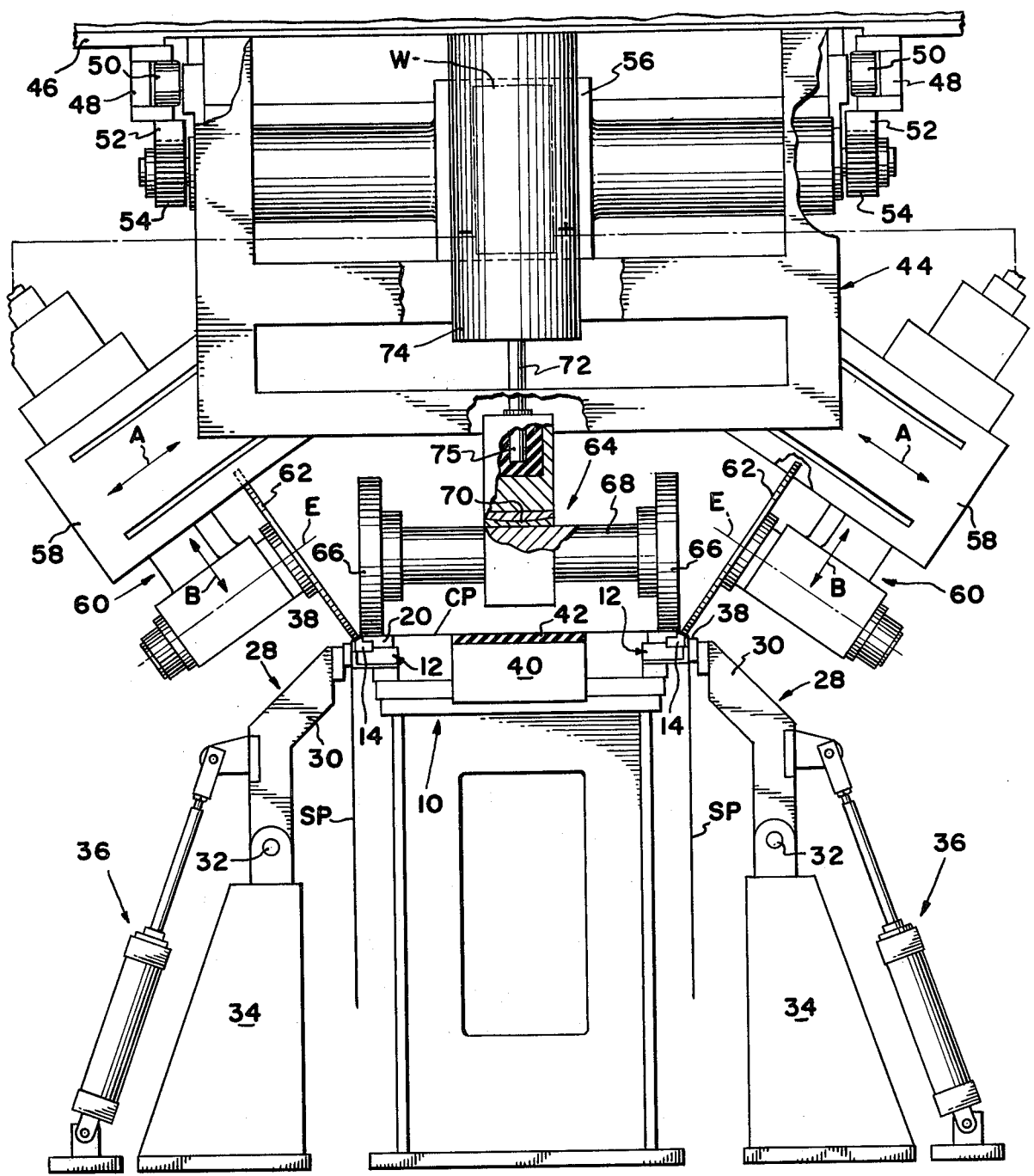

United States Patent [19]

Blair et al.

[11] 4,099,044

[45] Jul. 4, 1978

[54] WELDING APPARATUS

[75] Inventors: Robert H. Blair; Donald J. Janiske, both of Bay City, Mich.

[73] Assignee: Resistance Welder Corporation, Bay City, Mich.

[21] Appl. No.: 731,526

[22] Filed: Oct. 12, 1976

[51] Int. Cl.² ............................................. B23K 11/06
[52] U.S. Cl. ..................................... 219/82; 219/84; 219/119; 219/160
[58] Field of Search ...................... 219/81, 82, 83, 84, 219/119, 160

[56] References Cited

U.S. PATENT DOCUMENTS

| | | | |
|---|---|---|---|
| 1,096,506 | 5/1914 | Haskin | 219/160 |
| 2,205,680 | 6/1940 | Caputo | 219/84 |
| 2,766,369 | 10/1956 | Sacksteder | 219/81 |
| 3,542,990 | 11/1970 | Williams et al. | 219/82 |

*Primary Examiner*—J. V. Truhe
*Assistant Examiner*—N. D. Herkamp
*Attorney, Agent, or Firm*—Learman & McCulloch

[57] ABSTRACT

Resistance welding apparatus for simultaneously welding spaced generally parallel seams in sheet metal workpieces, as for example joining a pair of side panels to the back panel of a refrigerator cabinet. The panels are clamped upon a support table with their edges to be welded disposed in overlapping relationship. Support members of high electrical conductivity engage the underside of the clamped panels along and adjacent to the overlapped edge portions of the panels. A movable overhead carriage supports a pair of rotatable disc electrodes which are positioned to roll along the overlapped edge portions of the panels in opposed relationship to the underlying support members. Also mounted on the carriage are a pair of highly conductive shoes which roll along the central panel closely adjacent the respective electrodes. A highly conductive shaft electrically connects the shoes to each other to establish a confined low resistance electrical path for welding current which bridges the space in the central panel between the two seams to minimize current dissipation within the panel and the consequent power loss.

2 Claims, 2 Drawing Figures

WELDING APPARATUS

BACKGROUND OF THE INVENTION

The present invention is especially concerned with the provision of an improved arrangement for what will be referred to as the series twin seam welding of sheet metal panels. In this particular welding process, a pair of side panels may be simultaneously welded to opposite side edges of a central panel, this process being frequently employed in the fabrication of sheet metal housings or cabinets. Conventionally, in the prior art, twin seam welding has been accomplished by rolling a pair of disc electrodes along the overlapped edge portions of the panels while the panels are clamped upon a support table. The central panel of the group being welded has been relied upon to complete the electrical circuit between the two points of welding. Because the panels are normally of a substantial area, a substantial dissipation of current occurs within the central panel. The power supply carriage in such systems rolled on rubber wheels which functioned to press the central panel down. Prior to the filing of the present application a patentability search which was conducted uncovered the following patents.

| | | |
|---|---|---|
| 3,905,092 | 2,634,353 | 2,404,632 |
| 3,715,558 | 2,558,041 | 2,297,473 |
| 3,469,060 | 2,421,716 | 1,676,656 |
| | | 977,711 |

SUMMARY OF THE INVENTION

One of the prime objects of the invention is to provide an economical and reliable system of the character disclosed which promotes uniformity in the weld and is particularly useful in instances where a smooth line of weld is desired because it is exposed to view.

A further object of the invention is to provide a high speed system which with reduced power concentrates the application of welding heat to achieve better and more consistent weld quality.

In accordance with the present invention, panels to be welded are clamped in position on a support table with the edges of the panels to be welded arranged in overlapping relationship with each other. A highly conductive support member conformed generally to the underside of the seam is mounted on the support table and electrically insulated from the table. Above the table, a movable carriage, carrying a welding current supply, is mounted for movement along a path in which two disc electrodes operatively connected to the current supply roll along the overlapped edge portions of the panels in opposition to the support members.

The carriage also carries a twin roller assembly having a pair of spaced roller shoes located to contact the central panel in adjacent spaced relationship to the respective disc electrodes. A central shaft formed of highly conductive material electrically connects the rollers to each other.

The panels are arranged on the support table so that the side panel edges overlie the edges of the central panel. The disc electrodes thus ride on the edge of the side panels, while the two rollers roll upon the central panel closely adjacent to the overlapped portion. Current from one electrode thus flows through the overlapped joint between its associated side panel and the central panel and thence via the central panel and through the conductive underlying support member to the adjacent region of contact of the near roller. The conductive path from the one roller to the roller at the opposite side of the central panel is much more confined in terms of electrical current flow than is the central panel and thus a large portion of current flows from one roller to the other via the conductive shaft and thence via a relatively short path on the central panel and through the conductive support member to the second joint and thence via the side panel to the opposite electrode. The conductive rollers and shaft are supported from the carriage by a hydraulic motor which can be actuated to apply a downward pressure forcing the rollers into contact with the central panel.

Other objects and features of the invention will become apparent by reference to the following specification and the to drawings.

IN THE DRAWINGS

Figure 2:
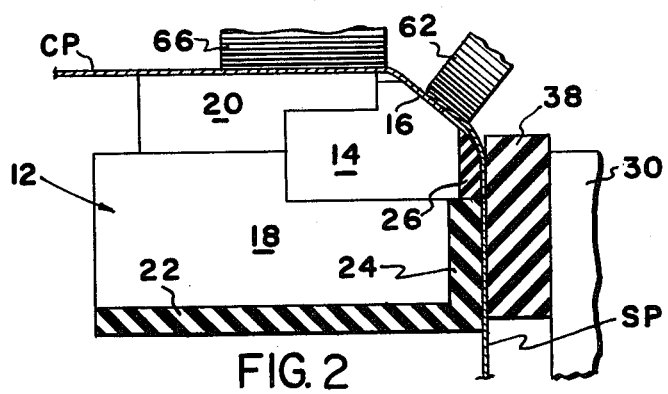

FIG. 1 is a fragmentary cross sectional view taken in a vertical plane with certain parts broken away, showing one form of apparatus embodying the present invention; and FIG. 2 is an enlarged detailed cross sectional view showing one of the two seams being welded.

Apparatus embodying the present invention includes a stationary support table designated generally 10 which fixedly supports a pair of spaced parallel elongate support member assemblies 12 shown in transverse cross section in the drawings. Support member assemblies 12 are constructed of copper or some other highly conductive material and are formed to underlie the overlapped edges of the panels to be welded. In the example shown in the drawings, a pair of side panels SP are to be welded to a central panel CP. The three panels may, for example, constitute the opposed side and bottom panel of a refrigerator cabinet liner which is welded with its bottom in inverse position.

Referring to the enlarged view, FIG. 2, it is seen that the edges of the central and side panels are bent approximately 45° from the main plane of the respective panels and are positioned with the central panel edge underlying the overlapped edge of the side panel. Support assembly 12 includes what will be referred to as an electrically conductive die member 14 having a surface 16 conformed to the configuration of the panel in the area where the same is to be formed. Die member 14 is in turn supported upon a base member 18 and an electrically conductive clamp member 20, the three members being appropriately bolted together, by means not shown, to assure a firm mechanical and electrical contact between the three members. The members 14 and 20 may typically be formed of copper and the member 18 of steel. Support member assembly 12 may be electrically isolated from the support table by a continuous pad of electrically insulating material 22, while side panel SP is likewise isolated from direct electrical contact with support member 12 by electrical insulation as at 24 and 26.

Referring to FIG. 1, the side panels SP are held in position by clamp assemblies designated generally 28 which include a clamping arm 30 pivotally mounted as at 32 upon a stationary pedestal 34. Hydraulic motors or cylinders 36 of well-known construction, and actuated in a well-known manner, are employed to swing clamping arms 28 between the clamping positions shown in the drawings and a retracted position clear of side panels SP. As best seen in FIG. 2, the clamping arms 30 are provided with pads 38 of electrical insulating material to prevent the flow of current from the side panels SP to the metallic portions of the side clamp assemblies 28. Central panel CP may be held in position upon the support table by means of an electromagnet 40 which may be electrically insulated as at 42 from panel CP.

A carriage assembly designated generally 44 is mounted for movement above table 10 in a direction perpendicular to the plane of the paper. A fixed frame 46 carries an opposed pair of support tracks 48 which receives rollers 50 rotatably journaled in the frame of carriage 44. On the underside of tracks 48 fixed racks 52 are operatively engaged by pinions 54 rotatably mounted on the frame of carriage 44 and driven in rotation as by suitably located drive motors schematically indicated as at 56. The rotation of pinions 54 is employed to drive carriage 44 in movement.

Carriage 44 includes a pair of outwardly and downwardly inclined arms 58, each of which carries an electrode assembly designated generally 60. Electrode assemblies 60 are supported in arms 58 for adjustable positioning relative to arms 58 in the directions indicated by arrows A and B in FIG. 1. Each electrode assembly carries a disc electrode 62 mounted for rotation upon the electrode assembly about the axis E. As best seen in FIG. 2, each electrode disc 62 is so positioned as to engage that portion of the adjacent side panel SP which overlaps the edge of central panel CP so that the electrode disc 62 can roll longitudinally along this overlapped portion upon driving movement of carriage 44. Electrode discs 62 are electrically connected to the opposite terminals of a welding current supply source W carried upon carriage 44. The welding current source is preferably a DC supply source and may comprise a conversion unit for transforming a three phase AC source to DC current pulses.

In addition to the disc electrodes 62, carriage 44 also mounts a twin roller shoe assembly designated generally 64. Roller assembly 64 includes a pair of rollers 66 directly coupled to each other by a solid shaft 68 and having only "line" contact with sheet CP. Rollers 66 and shaft 68 are formed from copper or some other material of high electrical conductivity. Shaft 68 is rotatably journaled in a floating bearing 70 with the axis of rotation of the shaft and rollers 66 lying in the same vertical general plane as the axes E of the disc electrodes and bearing 70 permitting some "tilt" flexibility. Bearing member 70 is mounted at the distal end of a piston rod assembly 72 of a hydraulic motor 74 whose cylinder is fixedly mounted upon carriage 44. Rollers 66 and shaft 68 are electrically isolated from piston rod 72 as by electrical insulation 75. Motor 74 may be actuated, in a well-known manner, to raise or lower rollers 66 into and out of contact with central panel CP and to exert a selected pressure firmly pressing rollers 66 into contact with panel CP to assure good electric contact between the rollers and the panel. Referring now to FIG. 2, it is seen that each roller 66 contacts only the central panel CP and presses panel CP into firm electric contact with the underlying clamp block 20 of each support assembly 12.

In operation, with the panels clamped in position as shown and welding pressure applied to force wheels 62 against the joint to be welded, the welding current source W is energized to apply direct current to the respective disc electrodes 62 and carriage drive motor 56 is actuated to drive carriage 44 along the seams to be welded. As seen in FIG. 2, electrode 62 is in contact only with side panel SP, and thus current flow occurs from the electrode 62 through the side panel SP and thence across the joint into the overlapped portion of central panel CP. From the joint between central panel CP and side panel SP, the current can flow either directly through a relatively short section of central panel CP to roller 66 or alternatively, the current can flow from the joint through panel CP to die member 14, thence to clamp block 20 and through central panel CP to roller 66. The electrical resistivity of the massive copper path from one roller 66 to the other via the central shaft 68 is substantially less than that offered to the current via the relatively thin central panel CP which is typically a steel alloy panel about 0.035 inch in thickness having a substantially higher resistivity than copper. Thus, the bulk of electric current flows from one seam to the other via the highly conductive wheel and shaft assembly 66, 68, 66 minimizing current dissipation losses which would otherwise be encountered in central panel CP. Current passes through the opposite joint to the opposite electrode 62 in the reverse of the flow described above. Power requirements can be reduced by this arrangement by 30 percent or more as compared to a device in which the twin roller assembly 64 is not employed. By the employment of a conductive roller-shaft assembly as described above, the welding speed can be increased substantially, without an increase in power. Moreover, the electrodes have a much longer life when a reduced power can be utilized to weld.

While one embodiment of the invention has been described, it will be apparent to those skilled in the art that the disclosed embodiment may be modified. Therefore, the foregoing description is considered exemplary rather than limiting, and the true scope of the invention is that defined in the following claims.

We claim:

1. In a resistance welding system for simultaneously seam welding a pair of side panels to opposite side edges of a central panel along widely transversely spaced parallel seams, a frame; clamping and support means thereon for clamping said panels in a fixed position with the edge portions of said panels which are to be welded to each other disposed in overlapped relationship with each other; a carriage supported by the frame, transversely spaced electrically conductive electrode means mounted on said carriage and movable with said carriage in welding contact longitudinally along the topside of the respective overlapped edge portions of said clamped panels, an opposite electrically conductive electrode for each means in planar alignment therewith supported by said frame on the underside of the overlapped edge portions and in engagement therewith to provide pairs of electrodes at opposite side edges of the central panel, and a welding current supply source connected in series between said pairs of electrodes, the improvement wherein each opposite electrode extends on said clamping and support means generally the entire length of the respective overlapped portions of said panels and has a first elongate portion engaging the underside of the overlapped portions of the panels opposite the side traversed by the associated electrode means, a second electrically conductive elongate portion connected electrically with said first portion and engaging the underside of the central panel transversely adjacent said overlapped portions of said panels, and highly electrically conductive traveling means having a considerably greater electrical conductivity than said central panel is provided for conducting welding current from one pair of electrodes to the other, the traveling means being mounted to move with said carriage longitudinally along and engaged with the top side of said central panel along a path parallel to the path of said electrodes directly above said second portions to conduct current, serially in a confined path, from one of said second portions up through the central path and over to the other second portion back through said central panel.

2. In a resistance welding system for simultaneously seam welding a pair of side panels to opposite side edges of a central panel along widely transversely spaced parallel seams, a frame; clamping and support means thereon for clamping said panels in a fixed position with the edge portions of said panels which are to be welded to each other disposed in overlapped relationship with each other; a carriage supported by the frame, transversely spaced electrically conductive exterior electrode wheels mounted on said carriage and movable with said carriage in rolling contact along the respective overlapped edge portions of said clamped panels, an opposite electrically conductive interior electrode for each wheel in planar alignment therewith supported by said frame on the opposite side of the overlapped edge portions and in engagement therewith to provide pairs of interior electrodes at opposite side edges of the central panel, and a welding current supply source connected in series between said pairs of electrodes, the improvement wherein each opposite electrode extends on said clamping and support means generally the entire length of the respective overlapped portions of said panels and has a first elongate portion engaging the side of the overlapped portions of the panels opposite the side traversed by the associated electrode wheel and a second elongate portion engaging the central panel transversely adjacent said overlapped portions of said panels, and a traveling assembly is provided for conducting welding current from one pair of electrodes to the other comprising a pair of electrically conductive wheels mounted on said carriage and movable with said carriage in rolling engagement with said central panel along the exterior side of said central panel along a path parallel to the path of said electrodes and in opposed relationship to said second portions of said conductive member, and including an electrically conductive axle commonly connected to said conductive wheels and electrically insulated from said carriage, to provide a confined serial path for conducting welding current.

* * * * *

UNITED STATES PATENT AND TRADEMARK OFFICE
CERTIFICATE OF CORRECTION

PATENT NO. : 4,099,044
DATED : July, 4, 1978
INVENTOR(S) : Robert H. Blair et al It is certified that error appears in the above–identified patent and that said Letters Patent are hereby corrected as shown below:

Column 2, line 17, change "the to" to -- to the --.

Column 2, line 37, change "panel" to -- panels --.

Column 5, line 8, change "path" to -- panel --.

Signed and Sealed this

Fifth Day of December 1978

[SEAL]

Attest:

RUTH C. MASON
*Attesting Officer*

DONALD W. BANNER
*Commissioner of Patents and Trademarks*